(12) United States Patent
Zheng

(10) Patent No.: US 10,464,585 B2
(45) Date of Patent: Nov. 5, 2019

(54) ELECTRONIC TAG DEVICE FOR RAIL TRAFFIC CONCRETE PREFABRICATED PARTS

(71) Applicant: Beijing Good Fortune Innovative Intelligence Technology Co. Ltd, Beijing (CN)

(72) Inventor: Yi Zheng, Beijing (CN)

(73) Assignee: Beijing Good Fortune Innovative Intelligence Technology Co.Ltd, Beijing (CN)

( * ) Notice: Subject to any disclaimer, the term of this patent is extended or adjusted under 35 U.S.C. 154(b) by 21 days.

(21) Appl. No.: 15/974,670

(22) Filed: May 8, 2018

(65) Prior Publication Data
US 2019/0126960 A1   May 2, 2019

(30) Foreign Application Priority Data
Aug. 23, 2017   (CN) ..................... 2017 2 1061345 U

(51) Int. Cl.
*G06K 19/077* (2006.01)
*B61L 25/06* (2006.01)
*E01B 1/00* (2006.01)
*E01B 3/28* (2006.01)
*B61L 3/12* (2006.01)
*B61L 27/00* (2006.01)

(52) U.S. Cl.
CPC .............. *B61L 25/06* (2013.01); *E01B 1/004* (2013.01); *E01B 3/28* (2013.01); *G06K 19/07749* (2013.01); *B61L 3/125* (2013.01); *B61L 27/0088* (2013.01)

(58) Field of Classification Search
CPC ........ G06K 19/00; G06K 19/04; G06K 19/07; G06K 19/0646
USPC ........................................ 235/492, 375, 487
See application file for complete search history.

*Primary Examiner* — Edwyn Labaze

(57) ABSTRACT

An electronic tag (Radio-frequency identification) device for a rail traffic concrete prefabricated parts is disclosed, which comprises a bracket. A column is on a top of the bracket. There is a groove on a top end of the column. The electronic tag is inside groove. The electronic tag device further comprises a waterproof end cap which is put on the top of the column. The pressure relief holes, the release-proof clasps, the rebar clamps, the groove on the column, etc. ensure a stable fixation of the electronic tag inside the concrete railroad sleeper. The waterproof end cap is able to protect and fix the electronic tag.

8 Claims, 2 Drawing Sheets

ELECTRONIC TAG DEVICE FOR RAIL TRAFFIC CONCRETE PREFABRICATED PARTS

CROSS REFERENCE OF RELATED APPLICATION

This is application claims priority under 35 U.S.C. 119 (a-d) to CN 201721061345.3, filed Aug. 23, 2017.

BACKGROUND OF THE PRESENT INVENTION

Field of Invention

The present invention relates to a railroad transportation field, and more particularly to an electronic tag device for rail traffic concrete prefabricated parts.

Description of Related Arts

China has over 6800 kilometers high-speed rail in operation and is the country has the most complete high-speed rail technology system, the strongest integration power, the longest operating kilometers, the highest speed train and the largest construction scale. With the development of the high-speed rail, the conventional technology is no longer able to meet the needs of railroad electronic informatization. The electronic tag is a non-contact automatic identification technology, which identifies the object and captures the related data through the RF (radio frequency) signal. The identification requires no manual intervention. The RFID has the advantages of water proof, magnetic proof, high temperature endurance, long service life, long reading range, encryptable, large storage capacity, convenient change of storage information, etc. The encoding, storage and read/write of the electronic tag are different to the conventional identification (bar code) or the handmade identification. The electronic tag is stored on the integrated circuit in a read-only format or read/write format. The read/write of the electronic tag is realized by electronic transmission. RFID is characterized in capability to identify specific object while identifying plural objects at the same time. The bar code is just able to read one by one. The information storage capacity of the electronic tag is large. The data are able to be read from outside of the material by radio frequency. The bar code needs to be read from the surface of the material by laser or infrared.

The precast concrete is widely adopted in railway construction. To combine the rail traffic concrete prefabricated parts with the electronic tag technology lays a solid foundation for the railway electronic informatization, which is convenient for positioning, inspection and replacement. The conventional electronic tag for the precast concrete is simple in structure and unable to bear the various force applied on during concrete pouring, which is easily shifted and unable to be fixed on a specified position. The railway construction requires electronic tag with high accuracy and standardization. The conventional electronic tag is unable to meet the requirements and be adopted in the production of railway precast concrete. A new type of electronic tag needs to be developed.

SUMMARY OF THE PRESENT INVENTION

An object of the present invention is to provide an electronic tag device for the rail traffic concrete prefabricated parts to solve the problem of electronic tag pre-embedment in the railroad sleeper. The electronic tag device in the present invention is placed in the mold while concrete pouring. The electronic tag device is integrated with the railroad sleeper after the concrete pouring.

The present invention adopts the following technical solution:

An electronic tag device for a rail traffic concrete prefabricated parts, comprising a bracket, a column and a waterproof end cap; wherein the bracket is in a U shape; the bracket comprises a left foot, a right foot and a beam which are integrated into one body; a rebar clamp is on a bottom of the left foot and the right foot respectively; a column is on a top of the beam; a top end of the column has a groove; the electronic tag is inside the groove; the waterproof end cap is put on the column; an inside of the waterproof end cap matches the column; the column and the waterproof end cap adopt thermoplastic materials; a fixing plate is integrated under the beam; a left end and a right end of the fixing plate is connected to the left foot and the right foot.

Furthermore, there are pressure relief holes on the fixing plate.

Furthermore, there are reinforcing stiffeners between the fixing plate and the beam of the of the bracket.

Furthermore, two coils of ultrasonic line are inside the waterproof end cap on a top.

Furthermore, there are release-proof clasps outside of the waterproof end cap.

Furthermore, the release-proof clasps are trigonal pyramidal bulges.

Furthermore, there are arranged concaves outside of the column.

Furthermore, the column is in a cylinder or cuboid shape; the inside of the waterproof end cap matches the column.

A method for adopting the electronic tag device for a rail traffic concrete prefabricated parts is also disclosed, which comprises the following steps:

step 1: checking whether the electronic tag is able to respond normally; if not, replace the electronic tag with a normal one;

step 2: capping the waterproof end cap with the column; thermo-bonding the waterproof end cap with the column by an ultrasonic welding machine;

step 3: placing the bracket in the mold of the rail traffic concrete prefabricated parts; fixing the bracket on the welded steel frame by the two rebar clamps; and step 4: concrete pouring the mold of the rail traffic concrete prefabricated parts to level the top end of the waterproof end cap with the rail traffic concrete prefabricated parts and achieve an end product of the rail traffic concrete prefabricated parts.

Compared with the conventional technology, the present invention has the following advantages:

The electronic tag device in the present invention is a pre-embedment device, which is fixed on the welded steel frame of the precast ware while installation. The present invention adapts to the features and producing method of the rail traffic concrete prefabricated parts, which is able to be widely applied in the precast box-girder bridge of the high speed railway, the precast concrete beam of the high speed railway, the double-block sleeper, high-iron III track plate, III type track plate, precast shielding segment of the subway, precast shielding segment and etc. The electronic tag device adopts split bracket and waterproof end cap, which is able to replace the fault electronic tag. The waterproof end cap is bonded with the column by the ultrasound. The assembly of the device is convenient. The fixing plate, the reinforcing stiffeners, the pressure relief holes, the rebar clamps and etc. are able to effectively prevent jitter of the device caused by uneven pressure and shaking during concrete pouring and ensure the electronic tag is accurately fixed on the designated position.

DETAILED DESCRIPTION OF THE PREFERRED EMBODIMENT

Embodiment 1

Figure 1:
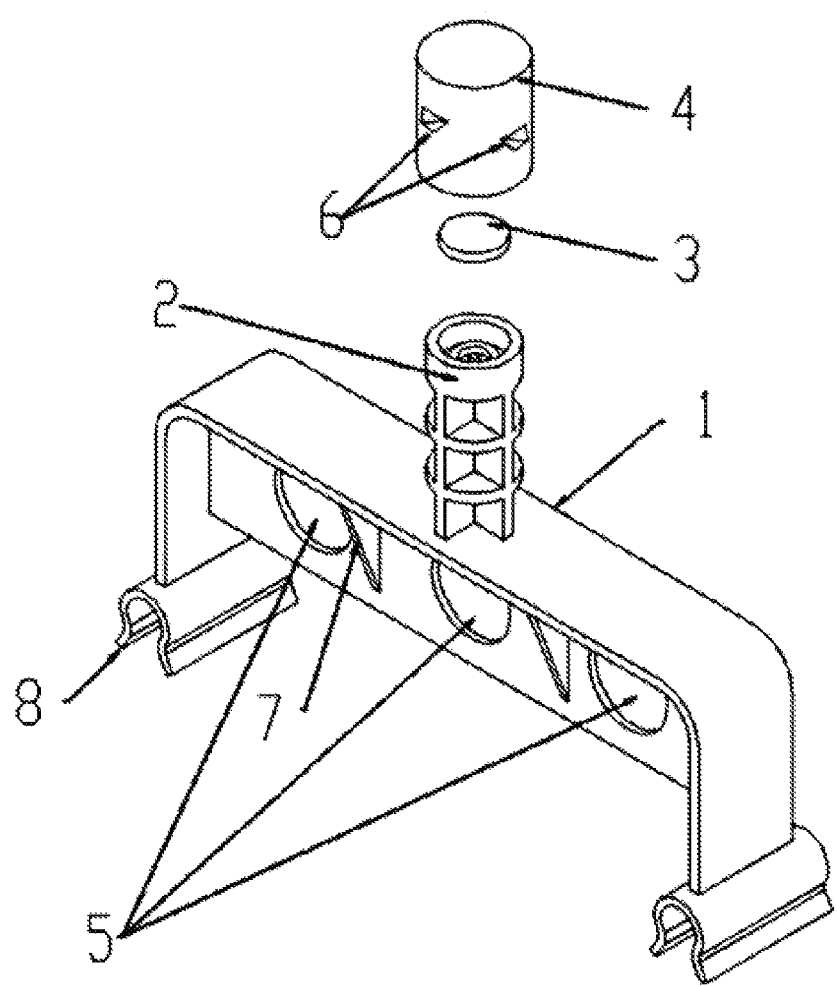
FIG. 1 is a perspective view of embodiment 1.
Figure 2:
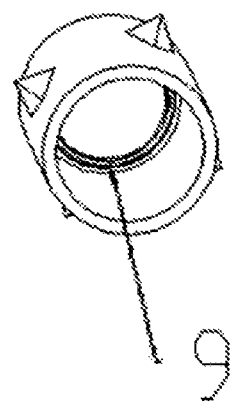
FIG. 2 is a perspective view of ultrasonic lines.

Referring to FIG. 1 of the drawings, an electronic tag device for a rail traffic concrete prefabricated parts, comprising a bracket 1, a column 2 and a waterproof end cap 4; wherein the bracket 1 is in a U shape; the bracket comprises a left foot, a right foot and a beam; a fixing plate is integrated under the beam; a left end and a right end of the fixing plate is connected to the left foot and the right foot; there are reinforcing stiffeners 7 between the fixing plate and the bracket 1; the fixing plate and the reinforcing stiffeners 7 are able to enhance the structural strength of the bracket 1 and prevent shaking during concrete pouring. Pressure relief holes 5 are on the fixing plate, which enables a free flow of the concrete through the two sides of the bracket and prevent shakings caused by the uneven concrete pressure on the left and right side of the bracket. A rebar clamp 8 is on the two feet of the bracket 1 respectively. The rebar clamp 8 is an elastic plastic clamp, which is able to be clipped on the welded steel frame of the precast concrete and fix bracket. The column 2 is on the top of the beam of the bracket 1. A groove is on the top of the column 2. The electronic tag 3 is inside the groove. The waterproof end cap 4 is on the top of the column 2. The column 2 is a cylinder. The inside of waterproof end cap 4 matches the column 2. There are arranged concaves outside of the column 2. The concrete flows into the arranged concaves after the concrete pouring to further fix the column 2. There are release-proof clasps 6 outside of the waterproof end cap 4. The release-proof claps 6 are trigonal pyramidal bulges. The release-proof claps are for fixing the waterproof end cap 4. There are two coils of ultrasonic line 9 inside the waterproof end cap on the top (as shown in FIG. 2). After confirming the electronic tag is working normally, the waterproof end cap 4 is integrated with the column 2 by the ultrasonic thermo-bonding.

The method for using the device comprises the following steps:

step 1: checking whether the electronic tag is able to respond normally; if not, replace the electronic tag with a normal one;

step 2: capping the waterproof end cap with the column; thermo-bonding the waterproof end cap with the column by an ultrasonic welding machine;

step 3: placing the bracket in the mold of the rail traffic concrete prefabricated parts; fixing the bracket on the welded steel frame by the two rebar clamps; and step 4: concrete pouring the mold of the rail traffic concrete prefabricated parts to level the top end of the waterproof end cap with the rail traffic concrete prefabricated parts and achieve an end product of the rail traffic concrete prefabricated parts.

Embodiment 2

Figure 3:
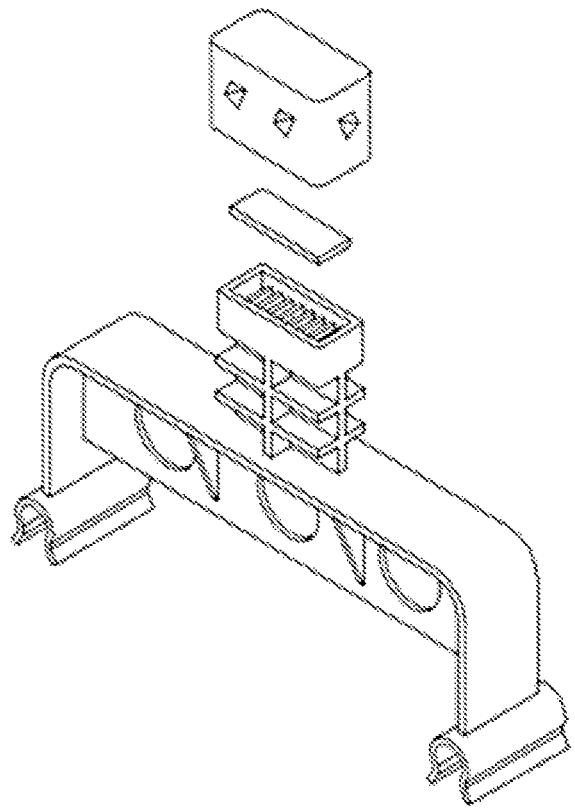
FIG. 3 is a perspective view of embodiment 2

Referring to FIG. 3 of the drawings, an electronic tag device for a rail traffic concrete prefabricated parts, comprising a bracket 1, wherein the bracket 1 is in a U shape; the bracket comprises a left foot, a right foot and a beam; a fixing plate is integrated under the beam; a left end and a right end of the fixing plate is connected to the left foot and the right foot; there are reinforcing stiffeners 7 between the fixing plate and the bracket 1; Pressure relief holes 5 are on the fixing plate. A rebar clamp 8 is on the two feet of the bracket 1 respectively. The column 2 is on the top of the beam of the bracket 1. A groove is on the top of the column 2. The electronic tag 3 is inside the groove. The waterproof end cap 4 is on the top of the column 2. The column 2 is a cuboid. The inside of waterproof end cap 4 matches the column 2. There are arranged concaves outside of the column 2. There are release-proof clasps 6 outside of the waterproof end cap 4. The release-proof claps 6 are trigonal pyramidal bulges. There are two coils of ultrasonic line inside the waterproof end cap on the top.

One skilled in the art will understand that the embodiment of the present invention as shown in the drawings and described above is exemplary only and not intended to be limiting. Any minor modifications and alterations based on present invention are within the protection range of the present invention.

What is claimed is:

1. An electronic tag device for a rail traffic concrete prefabricated parts, comprising a bracket, a column and a waterproof end cap; wherein the bracket is in a U shape; the bracket comprises a left foot, a right foot and a beam which are integrated into one body; a rebar clamp is on a bottom of the left foot and the right foot respectively; a column is on a top of the beam; a top end of the column has a groove; the electronic tag is inside the groove; the waterproof end cap is put on the column; an inside of the waterproof end cap matches the column; the column and the waterproof end cap adopt thermoplastic materials; a fixing plate is integrated under the beam; a left end and a right end of the fixing plate is connected to the left foot and the right foot.

2. The electronic tag device for the rail traffic concrete prefabricated parts, as recited in claim 1, wherein there are pressure relief holes on the fixing plate.

3. The electronic tag device for the rail traffic concrete prefabricated parts, as recited in claim 1, wherein there are reinforcing stiffeners between the fixing plate and the beam of the of the bracket.

4. The electronic tag device for the rail traffic concrete prefabricated parts, as recited in claim 1, wherein two coils of ultrasonic lines are inside the waterproof end cap on a top.

5. The electronic tag device for the rail traffic concrete prefabricated parts, as recited in claim 1, wherein there are release-proof clasps outside of the waterproof end cap.

6. The electronic tag device for the rail traffic concrete prefabricated parts, as recited in claim 1, wherein the release-proof clasps are trigonal pyramidal bulges.

7. The electronic tag device for the rail traffic concrete prefabricated parts, as recited in claim 1, wherein there are arranged concaves outside of the column.

8. The electronic tag device for the rail traffic concrete prefabricated parts, as recited in claim 1, wherein the column is in a cylinder or cuboid shape; the inside of the waterproof end cap matches the column.

* * * * *